United States Patent
Kociuba

(10) Patent No.: US 7,979,344 B2
(45) Date of Patent: Jul. 12, 2011

(54) SYSTEMS, METHODS, AND MEDIA FOR AUTOMATICALLY CONTROLLING TRADE EXECUTIONS BASED ON PERCENTAGE OF VOLUME TRADING RATES

(75) Inventor: James T. Kociuba, Wellesley Hills, MA (US)

(73) Assignee: BNY ConvergEx Group, LLC, New York, NY (US)

( * ) Notice: Subject to any disclaimer, the term of this patent is extended or adjusted under 35 U.S.C. 154(b) by 220 days.

(21) Appl. No.: 12/472,364

(22) Filed: May 26, 2009

(65) Prior Publication Data

US 2010/0023458 A1    Jan. 28, 2010

Related U.S. Application Data

(60) Provisional application No. 61/055,606, filed on May 23, 2008.

(51) Int. Cl.
    *G06Q 40/00* (2006.01)
(52) U.S. Cl. .......................................................... 705/37
(58) Field of Classification Search .............. 705/35–37; 707/962
    See application file for complete search history.

(56) References Cited

U.S. PATENT DOCUMENTS

| | | | | |
|---|---|---|---|---|
| 7,496,531 B1 * | 2/2009 | Gastineau et al. | ............ | 705/35 |
| 7,747,508 B1 * | 6/2010 | Silverman | .................. | 705/37 |
| 7,818,246 B2 * | 10/2010 | Cushing et al. | ............... | 705/37 |
| 2007/0038550 A1 * | 2/2007 | Caille et al. | ................... | 705/37 |
| 2007/0219897 A1 * | 9/2007 | Costa et al. | ................... | 705/37 |
| 2007/0250436 A1 * | 10/2007 | Mittal et al. | ................... | 705/37 |

OTHER PUBLICATIONS

Brown et al., "Trading Volume and Stock Investments", Financial Analysts Journal, v65n2, pp. 67-84, 2, Mar./Apr. 2009.*
Robert Almgren, Chee Thum, Emmanuel Hauptmann, and Hong Li, (2005), Equity Market Impact, LatinRisk, Sep. 2005.
Robert Kissel and Robert Malamut, (2006), Algorithmig Decision-Making Framework, The Journal of Trading, Winter 2006.
Andre F. Perold, (1988), The implementation shortfall: Paper versus reality, The Journal of Portfolio Management, Spring 1988.

* cited by examiner

*Primary Examiner* — Mary Cheung
(74) *Attorney, Agent, or Firm* — Byrne Poh LLP

(57) ABSTRACT

Systems, methods, and media for automatically controlling trade executions based on percentage of volume trading rates are provided. In some embodiments, systems for automatically controlling trade executions based on percentage of volume trading rates, are provided, the systems comprising at least one processor that: determines a market impact relationship for each of a plurality of positions included in a portfolio; determines a risk model associated with the portfolio; solves for a percentage of volume trading rate for each of the plurality of positions included in the portfolio based on the market impact relationship and the risk model; and causes trades to be executed in at least one of the plurality of positions included in the portfolio at the percentage of volume trading rate corresponding to the at least one of the plurality of positions.

21 Claims, 15 Drawing Sheets

Analytical Portfolio Execution - BNYConvergEx  400

A Font | Copy | Refresh Rate | Portfolio Details | Analytics | ?

402, 404, 408, 410, 412, 414, 416, 418, 420

DEFAULT

| Portfolio | Trades | Shares | REALIZED EXEC | | | | | REALIZED PERFORM. | | | UNREALIZED PERFORMANCE | | | UNREALIZED EXEC | | | |
|---|---|---|---|---|---|---|---|---|---|---|---|---|---|---|---|---|---|
| | | | Exec Shares | Exec Value$ | Shares | Value$ | Ex% | BPTS | CPS | USD | BPTS | CPS | USD | UnExecShares | UnExec$Value | Unex% | RiskAversion |
| LA_55 | 13 | 173,420 | 44,300 | $768,140 | | | %26 | 7 | 0.0100 | $524 | 38 | 4.2172 | $5,445 | 129,120 | $1,445,772 | %74 | 0.25 |
| ACN_0521 | 13 | 102,288 | 37,478 | $806,919 | | | %27 | 7 | 0.0200 | $562 | 6 | 1.1607 | $751 | 84,810 | $1,207,264 | %53 | 0.25 |

422, 424, 426, 428, 430

DEFAULT

| Portfolio | Side | Trades | Shares | REALIZED EXECUTIONS | | | REALIZED PERFORM. | | | UNREALIZED PERFORMANCE | | | UNREALIZED EXECUTIONS | | |
|---|---|---|---|---|---|---|---|---|---|---|---|---|---|---|---|
| | | | | Shares | Value$ | Ex% | BPTS | CPS | USD | BPTS | CPS | USD | Value$ | Shares | Unex% |
| ACN_0521 | BUY | 6 | 41,131 | 28,958 | $496,331 | %46 | -11 | -0.0300 | ($365) | -26 | -5.4895 | ($1,213) | $463,980 | 22,223 | %54 |
| ACN_0521 | SELL | 4 | 43,409 | 20,600 | $189,877 | %24 | -8 | -0.0100 | ($145) | -1 | -0.0132 | ($70) | $582,156 | 32,809 | %76 |
| ACN_0521 | SHORT | 3 | 17,628 | 7,920 | $120,712 | %45 | 106 | 0.1600 | $1,270 | 128 | 20.8023 | $2,034 | $162,126 | 9,778 | %55 |
| LA_55 | BUY | 13 | 173,420 | 44,300 | $768,140 | %26 | 7 | 0.0100 | $524 | 38 | 4.2172 | $5,445 | $1,445,772 | 129,120 | %74 |

406

10:33:32 STAT - SQLITE3 database file initizlied: d:/ficksumm20080521

10:00:04 | Process:0X0F08 ID:Lopexa.exe RefreshRate:10 seconds

FIG. 4

APEX Portfolio Details

ACN_0521 | A Font | Copy | Select | Analytics | Cross

Drag a column header here to group by that column — 502

| DEFAULT | | | EXECUTION 504 | | | | TRADING PARAMETERS 506 | | | | | PERFORMANCE 508 | | | 510 |
|---|---|---|---|---|---|---|---|---|---|---|---|---|---|---|---|
| Symbol | Sector | Side | Shares | Avg Price | $Value | %Shares | %Value | Source | Rate ▽ | MinPOV | Risk | Allow Cross | Cross Set. | BPTS | CPS | USD | Arrival Time |
| ROSE | Energy | BUY | 13,058 | $26.98 | $352,343 | 100% | 100% | SYSTEM | 15.00% | 0.05% | 6.88% | YES | SYSTEM | 6 | 0.0170 | $222.58 | 09:33 |
| SHLM | Materials | BUY | 1,800 | $22.65 | $40,763 | 26% | 26% | SYSTEM | 15.00% | 3.85% | -1.17% | YES | SYSTEM | -78 | -0.1762 | ($317.12) | 09:33 |
| FFG | Financials | SELL | 1,100 | $26.80 | $29,484 | 14% | 14% | SYSTEM | 12.23% | 5.03% | 1.98% | YES | SYSTEM | 215 | 0.5636 | $620.00 | 09:33 |
| GMA | Consumer Di | SHORT | 7,402 | $14.77 | $109,294 | 50% | 50% | SYSTEM | 9.80% | 3.00% | 1.36% | YES | SYSTEM | 113 | 0.1655 | $1,225.03 | 09:33 |
| HTZ | Industrials | SELL | 7,600 | $14.02 | $106,555 | 24% | 24% | SYSTEM | 8.51% | 2.02% | 5.31% | YES | SYSTEM | -77 | -0.1095 | ($832.00) | 09:33 |
| USAP | Materials | BUY | 1,200 | $37.99 | $45,588 | 56% | 56% | SYSTEM | 7.93% | 1.55% | -0.38% | YES | SYSTEM | -19 | -0.0708 | ($85.02) | 09:33 |
| SSYS | Information T | SHORT | 500 | $21.53 | $10,765 | 17% | 17% | SYSTEM | 7.35% | 1.63% | 0.91% | YES | SYSTEM | 43 | 0.0920 | $46.00 | 09:33 |
| PKE | Information T | SELL | 1,000 | $28.47 | $28,469 | 65% | 65% | SYSTEM | 5.12% | 0.56% | 0.27% | YES | SYSTEM | -28 | -0.0802 | $80.22 | 09:33 |
| CRAI | Industrials | BUY | 600 | $35.56 | $21,338 | 16% | 16% | SYSTEM | 3.86% | 3.76% | -1.53% | YES | SYSTEM | 58 | 0.2066 | $123.98 | 09:33 |
| ECOL | Industrials | SELL | 900 | $28.19 | $25,367 | 27% | 27% | SYSTEM | 1.80% | 1.77% | 0.94% | YES | SYSTEM | 59 | 0.1656 | $149.00 | 09:33 |
| GOL | Industrials | BUY | 2,300 | $15.78 | $36,297 | 14% | 14% | SYSTEM | 1.77% | 1.77% | -3.00% | YES | SYSTEM | -142 | -0.2213 | ($509.00) | 09:33 |
| | | | 37,478 | | $806,915 | | | | | | | | | | | $562 | |

Executions | Intraday Performance | Historical Performance

10:34:09 | Thread ID:0x04 AO Portfolio:ACN_0521 Refresh Rate:10 seconds

FIG. 5

```
double FunctionCalc( const double x[] )
{ double theMR = MarketRiskCalc( numNames, x,
theVCV, MX );
        double theMI = MarketImpactCalc ( numNames, x,
theKA, theKB );

return theMI + theRiskAv*sqrt( theMR );

```
double* RiskMXSetup ( long numNames, long* SharesRemaining,
                      double* Prices, double* ADV )
{ double* theMX = new double[ numNames ];

for ( int i = 0; i < numNames; i++ )
        {
              theMX[i] = sqrt(1.0/3.0)*Prices[i]*
                          (double)SharesRemaining[i]*
                          sqrt( abs( (double)SharesRemaining[i])
                          /(double)ADV[i] );
        }
        return theMX;

```
double* MarketImpactKASetup ( long numNames, long*
                              SharesRemaining, double*
                              Prices, double* Volatility )
{
        double* theKA = new double[ numNames ];

for ( int i = 0; i < numNames; i++ )
        {
              theKA[ i ] = (100.0 * 0.142 *
                           Volatility[i])/10000.0*
                           abs((double)SharesRemaining[i])
                           * Prices[i];
        }
        return theKA;
}
```

```
double* MarketImapctKBSetup( long numNames, long*
                             SharesRemaining, double* Prices,
                             double* ADV, double* Volatility,
                             double* SharesOut )
{
    double* theKB = new double[ numNames ];

for ( int i = 0; i < numNames; i++ )
    {
        theKB[i] = ((100. * 0.314 * Volatility[i] *
                    (abs((double)SharesRemaining[i])/(double)ADV[i])
                    * pow(((double)SharesOut[i]/(double)ADV[i]),0.25))/2.0)
                    /10000.0 * abs((double)SharesRemaining[i]) * Prices[i];
    } return theKB;
}
                                                                    1300
```

FIG. 13

```
double MarketImpactCalc ( long numNames, const double TradingRate[],
                          double* theKA, double* theKB )
{
        double theMI = 0.0;
        for ( int i = 0; i < numNames; i++ )
        {
                theMI = theMI + theKA[ i ]*pow( TradingRate[ i ],
                    3.0/5.0 ) + theKB[ i ];
        } return theMI;
}
                                                            1400
```

FIG. 14

```
double MarketRiskCalc( long numNames, const double TradingRate[],
                double** VCV, double* MX )
{
        double theMR = 0.0;
        for ( int i = 0; i < numNames; i++ )
        {
                for ( int j = 0; j < numNames; j++ )
                {
                        theMR = theMR+( MX[ i ]/
                                sqrt(TradingRate[ i ]))*
                                VCV[ i ][ j ]*(MX[ j ]/
                                sqrt( TradingRate[ j ] ));
                }
        } return theMR;
}
```

SYSTEMS, METHODS, AND MEDIA FOR AUTOMATICALLY CONTROLLING TRADE EXECUTIONS BASED ON PERCENTAGE OF VOLUME TRADING RATES

CROSS REFERENCE TO RELATED APPLICATION

This application claims the benefit of U.S. Provisional Patent Application No. 61/055,606, filed May 23, 2008, which is hereby incorporated by reference herein in its entirety.

TECHNICAL FIELD

The disclosed subject matter relates to systems, methods, and media for automatically controlling trade executions based on percentage of volume trading rates.

BACKGROUND

In the financial markets, many traders manage the execution of trades on large portfolios of positions in securities, such as stocks traded on various exchanges. When a trader desires to trade a large number of shares of a specific security, in many instances the trader will employee a Percentage of Volume (POV) trading strategy. In such a strategy, a percentage of the volume to be traded is executed at discrete time intervals throughout a trading period (or trade horizon), such as a trading day. Trading in this way may be beneficial because trading large volumes at once may distort the price for the securities to the disadvantage of the trader. That is, trading large volumes may have a disadvantageous market impact. To simplify this process for the trader, many algorithmic trading systems will automatically place trades for the trader at a given Percentage of Volume (POV) trading rate.

In many instances, a trader attempts to select a portfolio of securities that will maximize the expected return for the portfolio while minimizing the risk in that portfolio. As suggested above, maximizing the expected return for the portfolio may require controlling the market impact of a large trade. Similarly, when executing POV trades, it may be necessary to control the risk to the trader's portfolio due to those trades. Because making a trade that may decrease portfolio risk may also increase market impact, and vice versa, the trader frequently needs to make a trade-off between minimizing market impact while also minimizing portfolio risk. This trade-off is frequently referred to as the Trader's Dilemma.

SUMMARY

Systems, methods, and media for automatically controlling trade executions based on percentage of volume trading rates are provided. In some embodiments, systems for automatically controlling trade executions based on percentage of volume trading rates, are provided, the systems comprising at least one processor that: determines a market impact relationship for each of a plurality of positions included in a portfolio determines a risk model associated with the portfolio; solves for a percentage of volume trading rate for each of the plurality of positions included in the portfolio based on the market impact relationship and the risk model; and causes trades to be executed in at least one of the plurality of positions included in the portfolio at the percentage of volume trading rate corresponding to the at least one of the plurality of positions.

In some embodiments, methods for automatically controlling trade executions based on percentage of volume trading rates are provided, the methods comprising: determining a market impact relationship for each of a plurality of positions included in a portfolio; determining a risk model associated with the portfolio; solving for a percentage of volume trading rate for each of the plurality of positions included in the portfolio based on the market impact relationship and the risk model; and causing trades to be executed in at least one of the plurality of positions included in the portfolio at the percentage of volume trading rate corresponding to the at least one of the plurality of positions In some embodiments, computer-readable media containing computer-executable instructions that, when executed by a processor, cause the processor to perform a method for automatically controlling trade executions based on percentage of volume trading rates are provided, the method comprising: determining a market impact relationship for each of a plurality of positions included in a portfolio; determining a risk model associated with the portfolio; solving for a percentage of volume trading rate for each of the plurality of positions included in the portfolio based on the market impact relationship and the risk model, and causing trades to be executed in at least one of the plurality of positions included in the portfolio at the percentage of volume trading rate corresponding to the at least one of the plurality of positions.

BRIEF DESCRIPTION OF THE DRAWINGS

FIG. 4 is a diagram of a user interface for presenting realized and unrealized execution and performance data for portfolios in accordance with some embodiments.

FIG. 5 is a diagram of a user interface for displaying data for positions in a portfolio in accordance with some embodiments.

FIGS. 10-15 are diagrams illustrating examples of pseudo code for performing various processes as described herein in accordance with some embodiments.

DETAILED DESCRIPTION

In accordance with various embodiments, mechanisms for automatically controlling trade executions based on percentage of volume trading rates are provided. These mechanisms can be used in a variety of applications, such as automatic trading engines (sometimes referred to as algorithmic trading). Using these mechanisms, traders can trade securities, such as debt, equity, listed, NASDAQ NM, and unregistered securities, and/or any other suitable securities. Traders may include any party, and/or mechanism for, trading a security, whether for the benefit of the party or owner of the mechanism, or another. For example, a trader may be a person trading his or her own stock, a broker or an agent selling stock of another, a computer initiating an automated trade, etc.

In some embodiments, Percentage of Volume (POV) trading rates are determined for positions in a portfolio and used to control executions in those positions. These POV trading rates can be determined by performing a non-linear constrained optimization that takes into consideration the Trader's Dilemma, market impact cost functions, and portfolio risk models. The determination can also take into account market and position data and user inputs, such as a risk aversion parameter ($\lambda$), a cash balance constraint, POV trading rate override settings, and a trade time horizon value. In some embodiments, determinations can also be made as to whether positions in a portfolio are eligible for crossing (e.g., whether in a crossing engine or in any other non-open-market trading system) based on market impact and portfolio risk.

Figure 1:
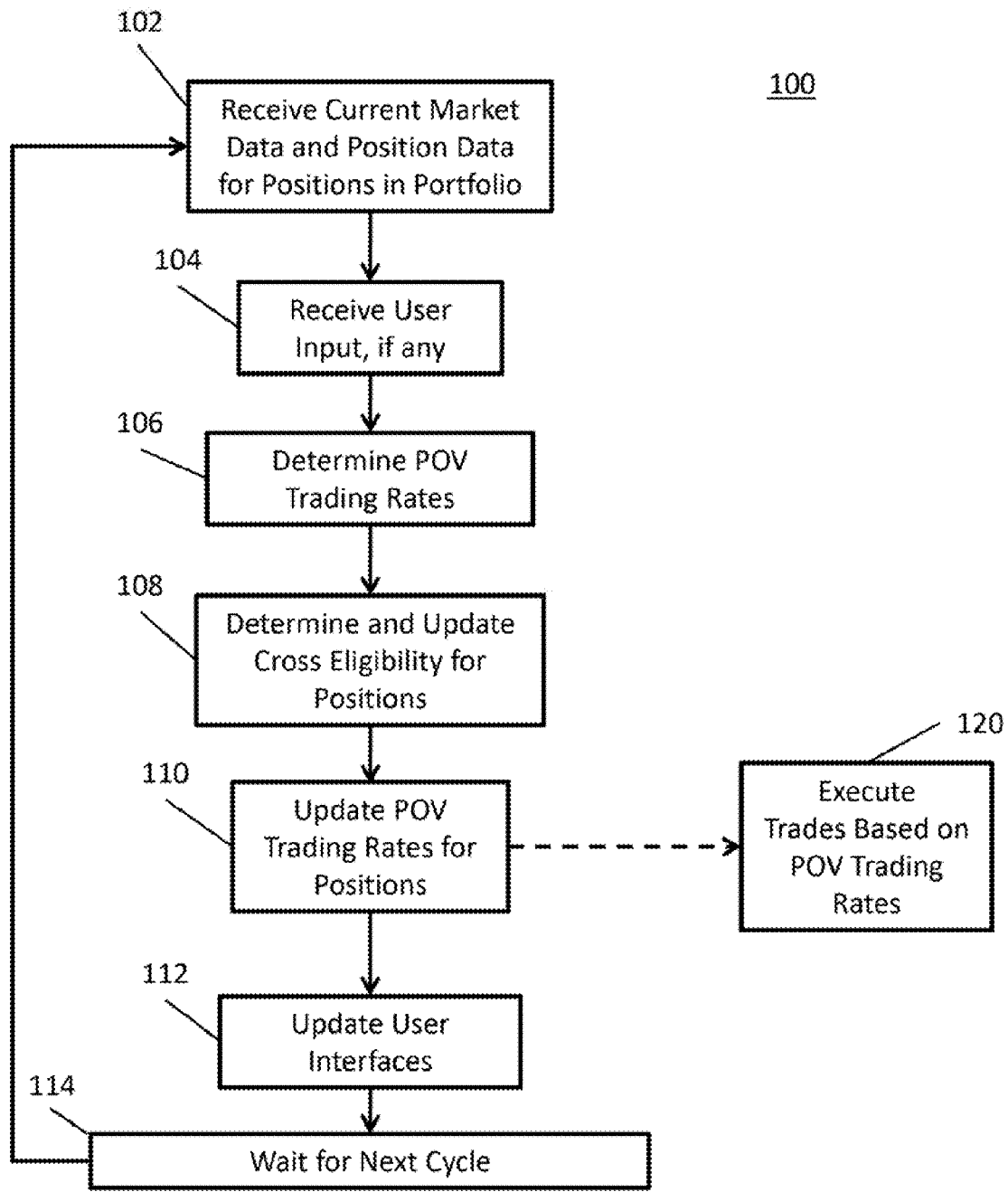
FIG. 1 is a diagram of a process for controlling trade executions based on Percentage of Volume (POV) trading rates in accordance with some embodiments.

Turning to FIG. 1, a process 100 for controlling trade executions based on Percentage of Volume (POV) trading rates in accordance with some embodiments is illustrated. As shown, beginning at 102, the process receives current market data and position data for positions in a portfolio. Any suitable market and/or position data can be received and from any suitable source. For example, for each position in a portfolio, process 110 can receive the current market price, the current market volume, and the current position data (e.g., shares held, shares outstanding, etc.). As another example, any suitable market and/or position data required for the processes and interfaces described herein in connection with FIGS. 1-8 can be received at 102.

Next, at 104, process 100 can receive any suitable user input. For example, user input can include a risk aversion parameter ($\lambda$), a cash balance constraint, POV trading rate override settings, a trade time horizon value, and/or any one or more of the user settings described below in connection with FIGS. 6-8.

More particularly, a risk aversion parameter may be included in the user input to represent a trade-off between market impact and portfolio risk over a trade time horizon, and may have any suitable value, such as 0.5 (which may be the default) or any other desired value (which may be between zero and two in some embodiments). A risk aversion parameter set to zero may cause slow trade execution because reducing market impact will be emphasized at the expense of portfolio risk. A risk aversion parameter set to two, on the other hand, may cause rapid trade execution because reducing portfolio risk will be emphasized at the expense of market impact.

The portfolio level cash balance constraints may be included in the user input to control the net long/short exposure remaining in the initial portfolio, the net long/short exposure of executions, etc. in order to target a specific net long/short exposure, a net long/short exposure window defined with two values (e.g., a minimum and a maximum exposure), etc. These net long/short exposure values can be entered in actual dollars, as a percentage of total portfolio exposure, etc.

A POV trading rate manual override value may be included in the user input to override a POV trading rate for one or more positions and may be expressed in absolute or scaling terms. For example, the override value may be a number in the range of 0.01% to 47%.

The trade time horizon value may be included in the user input to specify a maximum amount of time during which a trade must take place (e.g., such as one business day), and may have any suitable value such as fifteen minutes, one business day (which may be the default), ten market days, etc.

Figure 2:
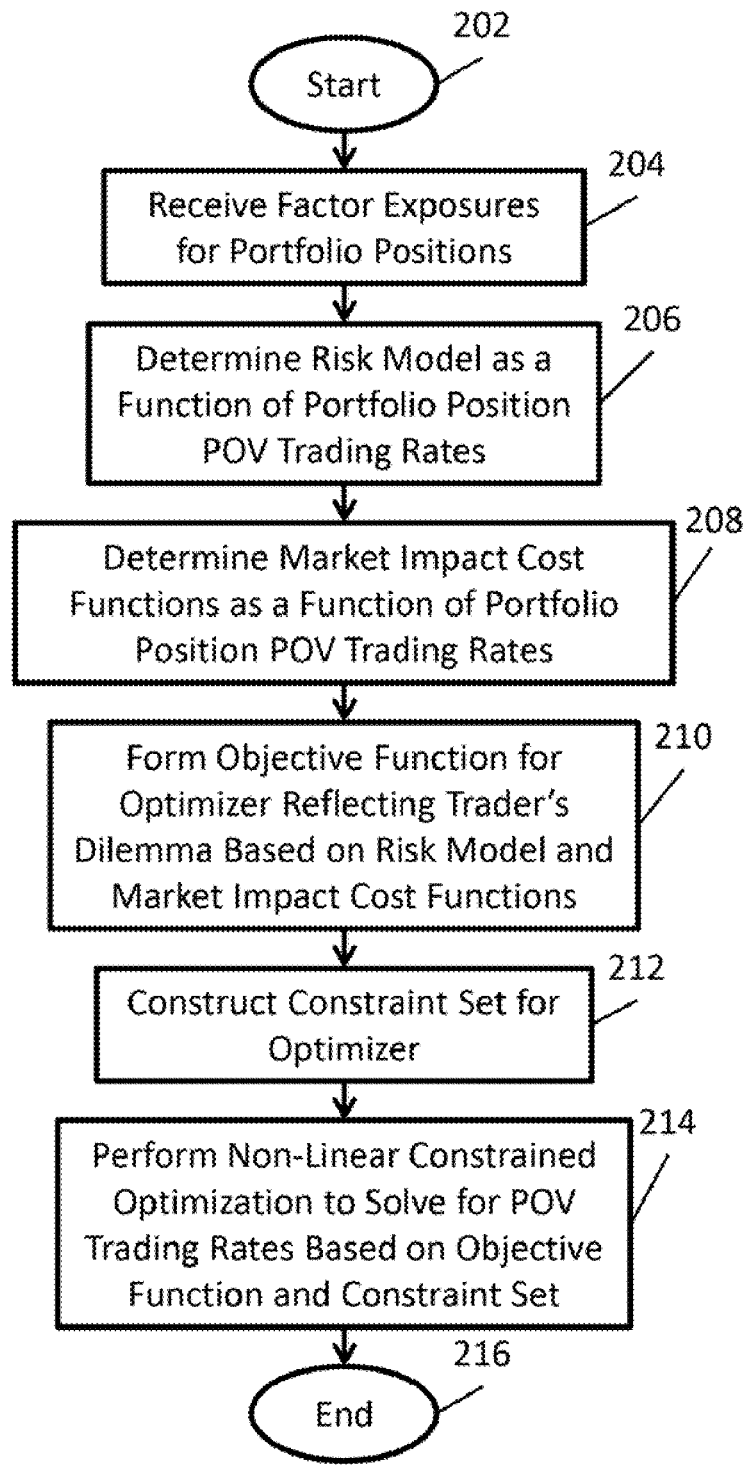
FIG. 2 is a diagram of a process for determining POV trading rates for positions in a portfolio in accordance with some embodiments.

Once the user input, if any, is received, process 100 can next determine, at 106, POV trading rates for positions in the portfolio. Any suitable process for determining POV trading rates for positions in the portfolio can be used in accordance with some embodiments. For example, a process 200 for determining POV trading rates in accordance with some embodiments is illustrated in FIG. 2.

Figure 3:
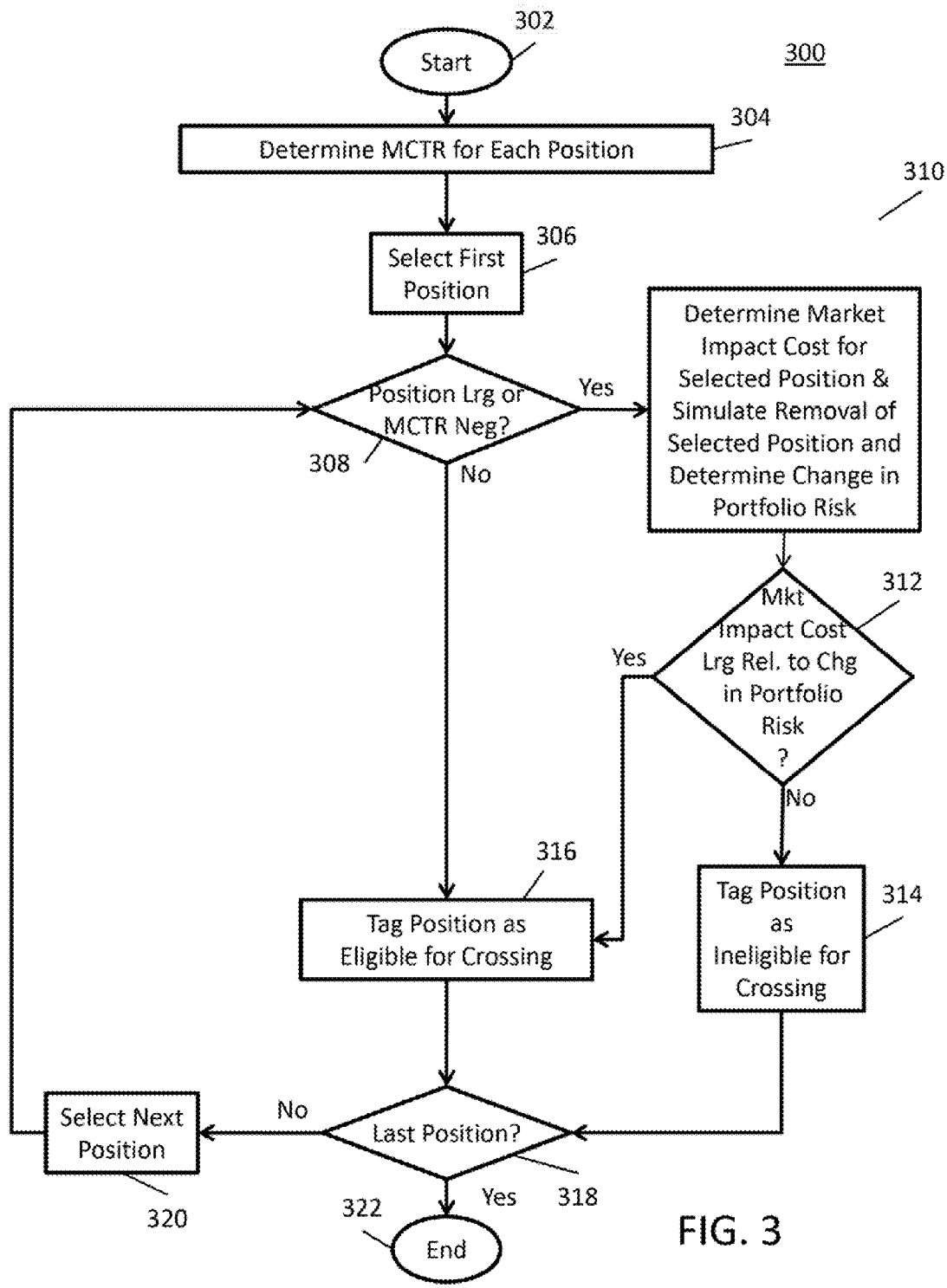
FIG. 3 is a diagram of a process for determining cross eligibility for positions in a portfolio in accordance with some embodiments.

At 108, process 100 can determine and update cross eligibility for positions in the portfolio. That is, process 100 can determine whether certain positions in the portfolio are eligible for crossing in a crossing engine or any other non-open-market trading system. Any suitable process for determining cross eligibility for positions in the portfolio can be used in accordance with some embodiments. For example, a process 300 for determining cross eligibility in accordance with some embodiments is illustrated in FIG. 3.

Next, POV trading rates for positions in the portfolio are updated at 110. By updating the POV trading rates at 110, the updated rates can be provided to an engine for controlling the execution of trades at 120 in the corresponding positions based on the updated POV trading rates. Once the trading rates are updated, the executions of trades at those rates at 120 can occur at any suitable time with respect to the cycle illustrated in FIG. 1. Any suitable mechanism for placing and executing trades at 120 can be used in accordance with some embodiments. For example, trades may be routed to and executed on the open market, in crossing systems or dark pools (subject to crossing eligibility), etc. in some embodiments.

One or more user interfaces can then be updated at 1112. Updating of the user interfaces can be done to reflect any suitable information. For example, the user interfaces can be updated to reflect changes in portfolio position data, market data, user inputs, POV trading rates, cross eligibility, placed orders, executed orders, etc. Examples of user interfaces that may be updated in accordance with some embodiments are described below in connection with FIGS. 4 and 5.

Finally, at 114, process 100 can wait for the next cycle to be triggered before looping back to 102. The next trade cycle can be triggered based on any suitable event, such as the passage of a given amount of time, or the occurrence of a given event. For example, the next cycle can be triggered based on the passage of two minutes (or any other suitable period of time) since the beginning of the current cycle. As another example, the next cycle can additionally or alternatively be triggered based on an unexpected execution of a position in the portfolio, based on a large size crossing execution of a position in the portfolio, etc.

Referring to FIG. 2, as mentioned above, an example of a process 200 for determining POV trading rates in accordance with some embodiments is illustrated. As shown, after process 200 begins at 202, the process receives factor exposures for portfolio positions at 204. In some embodiments, factor exposures are received for each portfolio position. Any suitable factor exposures may be received at 204. For example, the factor exposures may include net long/short exposure (e.g., in US dollars), industry, market capitalization (size), price to earnings ratio (P/E), debt to equity ratio (D/E), etc.

At 206, process 200 can next determine a portfolio risk model that is a function of portfolio position POV trading rates. This model may be determined based on any suitable criteria or criterion, such as based on the factor exposures received at 204 and the position data received at 102 (FIG. 1). For example, a model may be selected based on a default model, based on a user specified model, based on a model calculated as being suited for the portfolio, based upon standard portfolio risk theory, etc. As a more particular example, when the model is determined based on standard portfolio risk theory, the model may be determined by applying portfolio risk theory to each time slice of a trading horizon and summing the variance over the time slices, as described in Grinold and Kahn, Active Portfolio Management, McGraw-Hill, 1999. In some embodiments, the same model may always be used for a portfolio and the determination of the model to be used may simply be using that model.

An example of a discrete portfolio risk model that can be used in accordance with some embodiments is represented by equation (1) below:

$$\sigma_{dp}^2 = \sum_{i=1}^{R}\left[\sum_{j=1}^{N}\sum_{k=1}^{N} P_j S_{j,i}\sigma_{j,k}\left(\frac{t}{2}\right)P_k S_{k,i}\right], \quad (1)$$

wherein;
P is the current price of a position,
σ is the daily variance covariance;
t is the trading horizon (e.g., expressed in days);
R is the number of discrete periods within t;
N is the number of positions in the portfolio; and
S is the number of shares in the position, where S is positive for buy orders and negative for sell or sell short orders, and where S is determined by the recursion in equation (2) below:

$$S_{x,i+1} = \text{sign}(S_{x,i})\max\left(0, |S_{x,i}| - V_x\alpha_x\left(\frac{t}{R}\right)\right) \quad (2)$$

wherein:
$S_{X,O}$ is the current number of shares in a position x;
$V_x$ is the daily volume forecast for position x; and
$\alpha_X$ is the POV trading rate for position x.

To apply this model in some embodiments, based on the trade duration of stock i ($t_i$) equaling $S_i/\alpha_i V_i$, wherein $V_i$ is the average daily volume of position i, equation (1) can be rewritten as the continuous portfolio risk:

$$\sigma_{cp}^2 = \sum_{j,i=1\ldots N} \sigma_{j,i}\sqrt{t_i t_j}\, P_j S_j P_i S_i \int_0^{\min(t_i,t_j)}\left(1-\frac{t}{t_i}\right)\left(1-\frac{t}{t_j}\right)dt. \quad (3)$$

Finally, this model can be represented by equations (4) and (5) by approximating equation (3) as:

$$\sigma_{cp}^2 = \sum_{j,i=1\ldots N} \tau_{ij}\sigma_{j,i}\sqrt{t_i t_j}\, P_j S_j P_i S_i, \quad (4)$$

wherein $\tau_{ij}$ is described by a parametric surface $\tau_{ij}=f(t_i,t_j)$ that is an estimate of the following expression:

$$\frac{1}{3}\frac{\min(t_i,t_j)^3}{t_i t_j} - \frac{1}{2}\left(\frac{1}{t_j}+\frac{1}{t_i}\right)\min(t_i,t_j)^2 + \min(t_i,t_j) \quad (5)$$

This smooth surface is cubic and exhibits C² parametric continuity between segments. The surface can be fit using the Generalized Least Squares method.

Market impact cost functions as a function of portfolio position POV trading rates can next be determined at 208. These functions may be determined based on any suitable criteria or criterion. For example, these functions may be selected based on a default set of functions, based on a user specified set of functions, based on a set of functions calculated as being suited for the portfolio, etc. In some embodiments, the same set of functions may always be used for a portfolio and the determination of the set of functions to be used may simply be using those functions. In some embodiments, different sets of function can be used for some positions in a portfolio, for example based on characteristics of those positions.

An example of a market impact cost functions that can be used in accordance with some embodiments is represented by equations (6) and (7) below:

$$I(S_j) = \gamma\sigma_j \frac{S_j}{V_j}\left(\frac{\theta_j}{V_j}\right)^\delta \quad (6)$$

$$TI(S_j) = \text{sign}(S_j)\eta\sigma_j(\alpha_j)^\beta \quad (7)$$

wherein:
$I(S_j)$ is the permanent price impact of a trade in position j;
$TI(S_j)$ is the temporary price impact of a trade in position j;
$\theta_j$ is the number of shares outstanding in position j;
$S_j=\alpha_j V_j$;
γ=0.314;
η=0.142;
δ=0.267; and
β=0.600.

These values of γ, η, δ, and β may be suitable for large capitalization securities. While specific values for γ, η, δ, and β are illustrated above, any suitable values can be used in accordance with some embodiments. For example, different values for γ, η, δ, and β can be calculated as described in Almgren et al., "Equity Market Impact," LatinRisk, September 2005, which is hereby incorporated by reference herein in its entirety. In some embodiments, rather than being constant, values for γ and η can be a function of market capitalization and/or percentage of average daily volume.

Once the market impact cost functions have been selected, an objective function for an optimizer can be formed at 210. This objective function can reflect the Trader's Dilemma, the portfolio risk model, and the market impact cost functions. The Trader's Dilemma reflected by this objective function can be represented by the following expression:

$$\min_{\alpha_i}(\lambda\sigma_{dp}(\alpha_i)^2 + m(\alpha_i)) \quad (8)$$

wherein:
λ is the selected risk aversion value;
$\alpha_i$ is the POV trading rate for position i;
$m(\alpha_i)$ is the market impact in dollars, for example ($I(S_j)$/ 2+$TI(S_j)$)) multiplied by the absolute value of the position exposure (e.g., price times shares);
$\sigma_{dp}(\alpha_i)^2$ is the portfolio variance in dollars.

Next, at 212, a constraint set for the optimizer can be constructed. This constraint set can be based on user input, such as that received at 104 (FIG. 1), based on default settings, based on fixed settings, etc. For example, the constraint set can take into account POV trading rate override values configured by a user in some embodiments.

Finally, process 200 can solve for the optimized POV trading rates based on the objective function and the constraint set at 214 and terminate at 216. Solving for the optimized POV trading rates can be performed using non-linear constrained optimization in some embodiments. For example, using Nonlinear Sequential Quadratic Programming with constraints, as well as its closed-form gradient, the Trader's Dilemma represented by expression (8) can be solved using equation (4), expression (5), and equation (6) and/or (7). Nonlinear Sequential Quadratic Programming is further described in Ruszczynski, "Nonlinear Optimization," Princeton University Press, 2006, which is hereby incorporated by reference herein in its entirety.

Referring to FIG. 3, as mentioned above, an example of a process 300 for determining eligibility of a position for crossing in a crossing engine or other non-open-market trading system in accordance with some embodiments is illustrated. As shown, after process 300 begins at 302, the process can determine the Marginal Contribution to Risk (MCTR) for each position. Any suitable mechanism for determining the MCTR for each position can be used in some embodiments. For example, the MCTR for position i can be calculated using the following equation:

$$MCTR_i = \frac{d\sigma_p}{dw_i} = \frac{w_i\sigma_{ii} + \sum_{j \ne i} w_i\sigma_{ij}}{\sigma_p} \qquad (9)$$

wherein:
$w_i$ is the holding weight for position i;
$\sigma_{ij}$ is variance covariance for position i; and
$\sigma_p$ is portfolio volatility.

The MCTR value can be positive or negative. A positive value indicates that the holding increases portfolio risk, while a negative value indication that the holding reduces portfolio risk.

Next, at 306, process 300 selects the first position in the portfolio. Any suitable approach for selecting the first position can be used in some embodiments. For example, a position can be selected alphabetically (e.g., by position symbol), by size, etc.

Process 300 can then determine if the selected position is large or the MCTR for that position is negative at 308. Any suitable approach for determining if a position is large can be used in some embodiments. For example, a position can be determined as being large if the position is one standard deviation of the average portfolio position size. If the position is determined to be large or the MCTR for the position is determined to be negative, process 300 can then determine the market impact cost for a selected position, and simulate removal of the selected position and determine the change in portfolio risk due to the removal of the selected position at 310. Any suitable approach for determining the market impact cost for the selected position can be used in some embodiments. For example, the market impact cost can be determined by applying the POV trading rate for the selected position to the market impact cost function determined at 208 (FIG. 2). Any suitable approach for determining the change in portfolio risk can be used in accordance with some embodiments. For example, the change in portfolio risk can be determined by repeating process 200 (FIG. 2) for the portfolio without the selected position and comparing the portfolio risk values determined by applying the POV trading rates for each portfolio to the portfolio risk model determined at 206 (FIG. 2).

At 312, process 300 can next determine if the market impact cost determined at 310 is large relative to the change in portfolio risk determined at 310. Any suitable approach for determining whether the market impact cost is large relative to the change in portfolio risk can be used in some embodiments. For example, the market impact cost can be determined to be large relative to the change in portfolio risk if the market impact cost is larger than the change in portfolio risk. If the market impact cost is determined to not be large relative to the change in portfolio risk, then the selected position is tagged as being ineligible for trading at 314. Otherwise, the selected position is tagged as being eligible for trading at 316. Any suitable approach for tagging the selected position as being eligible or ineligible for trading can be used in some embodiments. For example, a flag associated with the position can be set or reset in some embodiments.

If, however, at 308, the selected position is determined not to be large and the MCTR for the selected position is determined to be positive, then process 300 can tag the selected position as being eligible for trading at 316.

After 314 or 316 is completed, process 300 can determine if the selected position is the last position in the portfolio at 318. If the selected position is determined to not be the last position, process 300 can select the next position at 320 and then loop back to 308. Otherwise, process 300 can terminate at 322.

Turning to FIGS. 4 and 5, two examples of user interfaces for displaying portfolio positions in accordance with some embodiments are illustrated. As shown in FIG. 4, portfolio-position and realized and unrealized execution and performance relative to a benchmark data can be displayed in an interface 400. For example, interface 400 can include a menu portion 402, a portion 404, and a portion 406. Menu portion 402 can include a portfolio details button 408 for displaying a user interface showing details of a selected portfolio in one of portions 404 or 406, for example as illustrated in FIG. 5 and described below.

Portion 404 can include a default section 410, a realized executions section 412, a realized performance section 414, an unrealized performance section 416 and an unrealized executions section 418. The default section may include indicators of a portfolio name, a total number of trades to be executed for a portfolio, and a total number of shares to be executed for a portfolio. The realized executions section can include indicators of executed shares for realized executions for each portfolio, the execution value for realized executions for each portfolio, and the execution percentage for realized executions for each portfolio. The realized performance section can include indicators of the value (e.g., in US Dollars) of realized executions for each portfolio, the cents per share (CPS) for realized executions for each portfolio, and the basis points for realized executions for each portfolio. The unrealized performance section can include indicators for the value (e.g., in US Dollars) of unrealized executions for each portfolio, the cents per share (CPS) for unrealized executions for each portfolio, and the basis points for unrealized executions for each portfolio. The unrealized executions section can include indicators of unexecuted shares for unrealized executions for each portfolio, the unexecuted value for unrealized executions for each portfolio, and the unexecuted percentage for unrealized executions for each portfolio. Portion 404 can also include any other suitable indicator for each portfolio. For example, portion 404 can include indicators of settings for the portfolio, such as the risk aversion value 420 for each portfolio.

Portion 406 can also include a default section 422, a realized executions section 424, a realized performance section 426, an unrealized performance section 428, and an unrealized executions section 430. The default section may include indicators of a portfolio name, a side for the portfolio (e.g., buy, sell, short, etc.), a total number of trades to be executed for a portfolio, and a total number of shares to be executed for a portfolio. The realized executions section can include indicators of executed shares for realized executions for each portfolio, the execution value for realized executions for each portfolio, and the execution percentage for realized executions for each portfolio. The realized performance section can include indicators of the value (e.g., in US Dollars) of realized executions for each portfolio, the cents per share (CPS) for realized executions for each portfolio, and the basis points for realized executions for each portfolio. The unrealized performance section can include indicators for the value (e.g., in US Dollars) of unrealized executions for each portfolio, the cents per share (CPS) for unrealized executions for each portfolio, and the basis points for unrealized executions for each portfolio. The unrealized executions section can include indicators of unexecuted shares for unrealized executions for each portfolio, the unexecuted value for unrealized executions for each portfolio, and the unexecuted percentage for unrealized executions for each portfolio.

FIG. 5 illustrates a user interface 500 for displaying portfolio details in accordance with some embodiments. As indicated above, interface 500 can be presented in response to a user selecting a portfolio details option 408 for a selected portfolio from a menu 402. Interface 500 can include a default section 502, an execution section 504, a trading parameters section 506, and a performance section 508. Default section 502 can include indicators for the symbol name for each position in a portfolio, the sector for each position in the portfolio, and the side (e.g., buy, sell, short, etc.) for each position in the portfolio. The execution section can include indicators for the number of shares executed for each position in the portfolio, the average price for executions for each position in the portfolio, the value for executions for each position in the portfolio, the percentage of executions in shares for each position in the portfolio, and the percentage of executions in dollars for each position in the portfolio. The trading parameters section can include indicators for the source of executions for each position in the portfolio, the current POV trading rates for each position in the portfolio, minimum POV trading rate for each position in the portfolio, the risk for each position in the portfolio, whether crosses (e.g., matching of trade sides in a trade matching engine) are permitted for each position in the portfolio, and where crosses are to be performed for each position in the portfolio. The performance section 508 can include indicators of the basis points for executions for each position in the portfolio, the cents per share for executions for each position in the portfolio, and the value of executions for each position in the portfolio. Interface 500 can also include any other suitable indicators for each position. For example, interface 500 can include an arrival time indicator 510 for each position.

Figure 6:
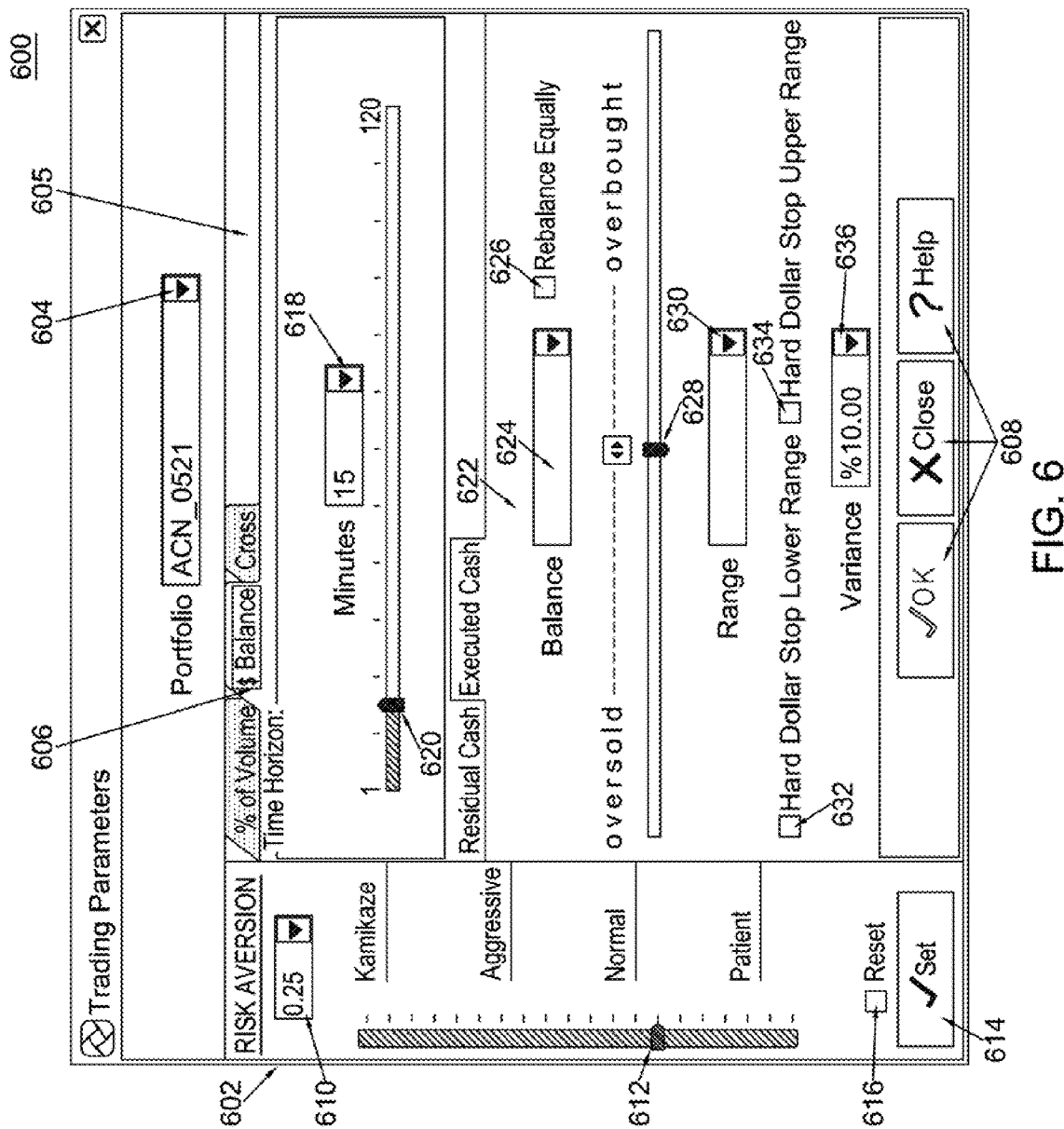
FIGS. 6-8 are diagrams of user interfaces for configuring trading parameters in accordance with some embodiments.

Turning to FIG. 6, a user interface 600 for selecting trading parameters for a portfolio in accordance with some embodiments is illustrated. As shown, interface 600 can include a risk aversion portion 602, a portfolio selection menu 604 (which can be used to select a portfolio to be configured using interface 600), a tabs portion 605, and OK, cancel, and help buttons 608.

Risk aversion portion 602 can be used to select a risk aversion value for the portfolio in accordance with some embodiments. Portion 602 can include a drop down menu 610 and a slider 612 for selecting a risk aversion value. Once selected, the value can be set by selecting set button 614. Alternatively, to reset the risk aversion value to a default setting, the check box 616 can be selected.

Tabs portion 605 can include a dollar balance tab 606. Tab 606 can include a menu 618 and a slider 620 for selecting a maximum amount of time that the portfolio can be out of dollar balance. Any suitable units of time can be used in some embodiments. For example, as shown, the units of time can be minutes. Tab 606 can also include an executed cash sub-tab 622. Sub-tab 622 can include a menu 624 and a slider 628 for selecting the cash balance constraint. Sub-tab 622 can also include a range menu 630 that can be used for selecting a range for the cash balance constraint, and check boxes 632 and 634 for selecting a hard dollar stop lower range and a hard dollar stop upper range, respectively. Sub-tab 622 can also include a variance menu 636 for selecting a tolerance on the cash balance. Once the settings shown in interface 600 are configured as desired, a user can accept the settings by pressing OK button in buttons 608. Alternatively, the user can reject any changes by pressing the close button in buttons 608.

Figure 7:
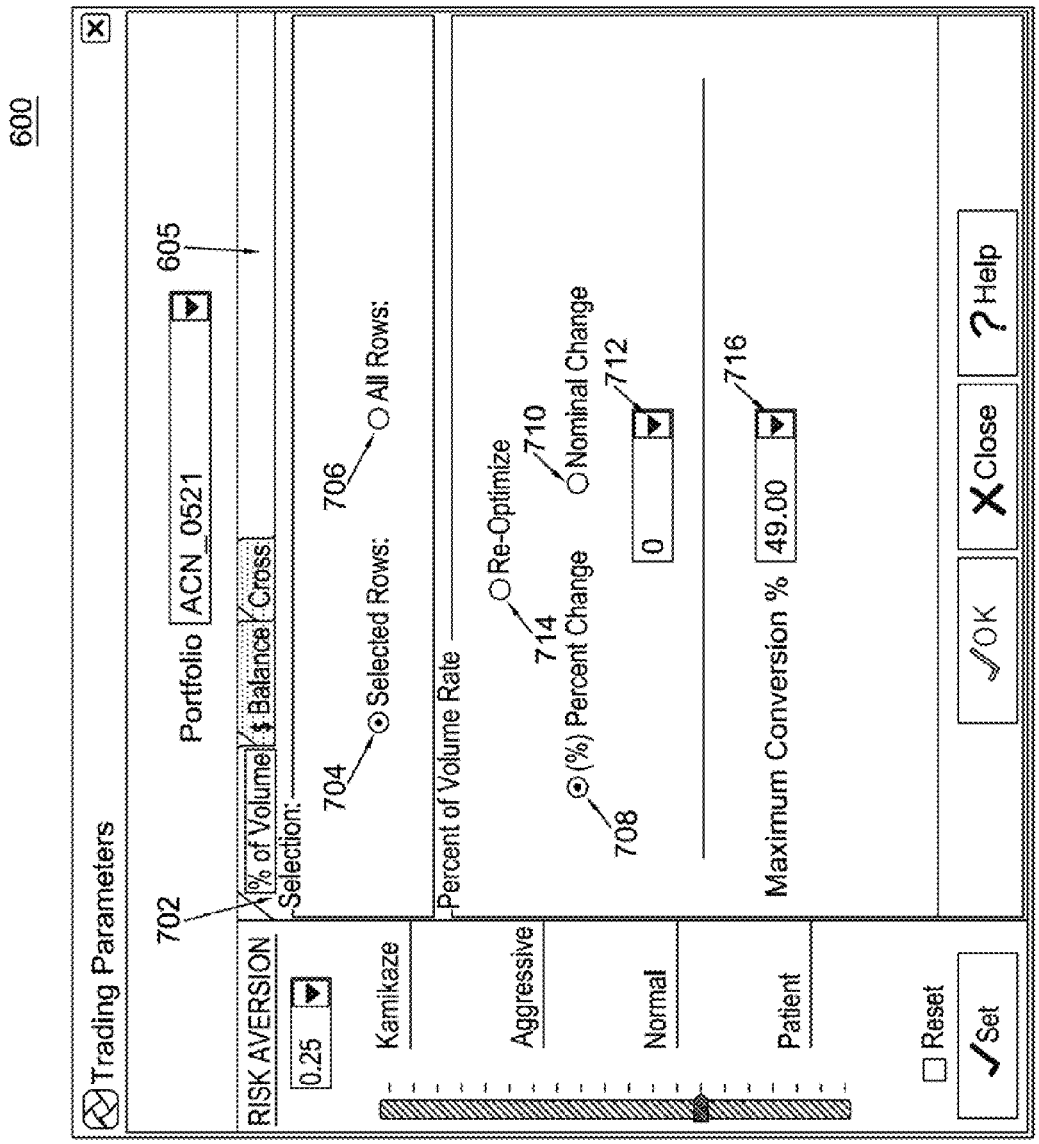

Tabs 605 can also include a percentage of volume settings tab 702 as shown in FIG. 7 in accordance with some embodiments. Tab 702 can include radio buttons 704 and 706 for selecting whether the percentage of volume trading rate setting selections in tab 702 are to be applied to only the selected positions in the portfolio or all positions in the portfolio, respectively. Tab 702 can also include radio buttons 708 and 710 for selecting whether to set POV trading rates based on a percent change or a nominal rate, a menu 712 for selecting the percent change or the nominal rate, and a radio button 714 for selecting to re-optimize the percentage of volume rates for the portfolio. Finally, tab 702 can include a menu 716 for selecting the maximum conversion percentage for the portfolio.

Figure 8:
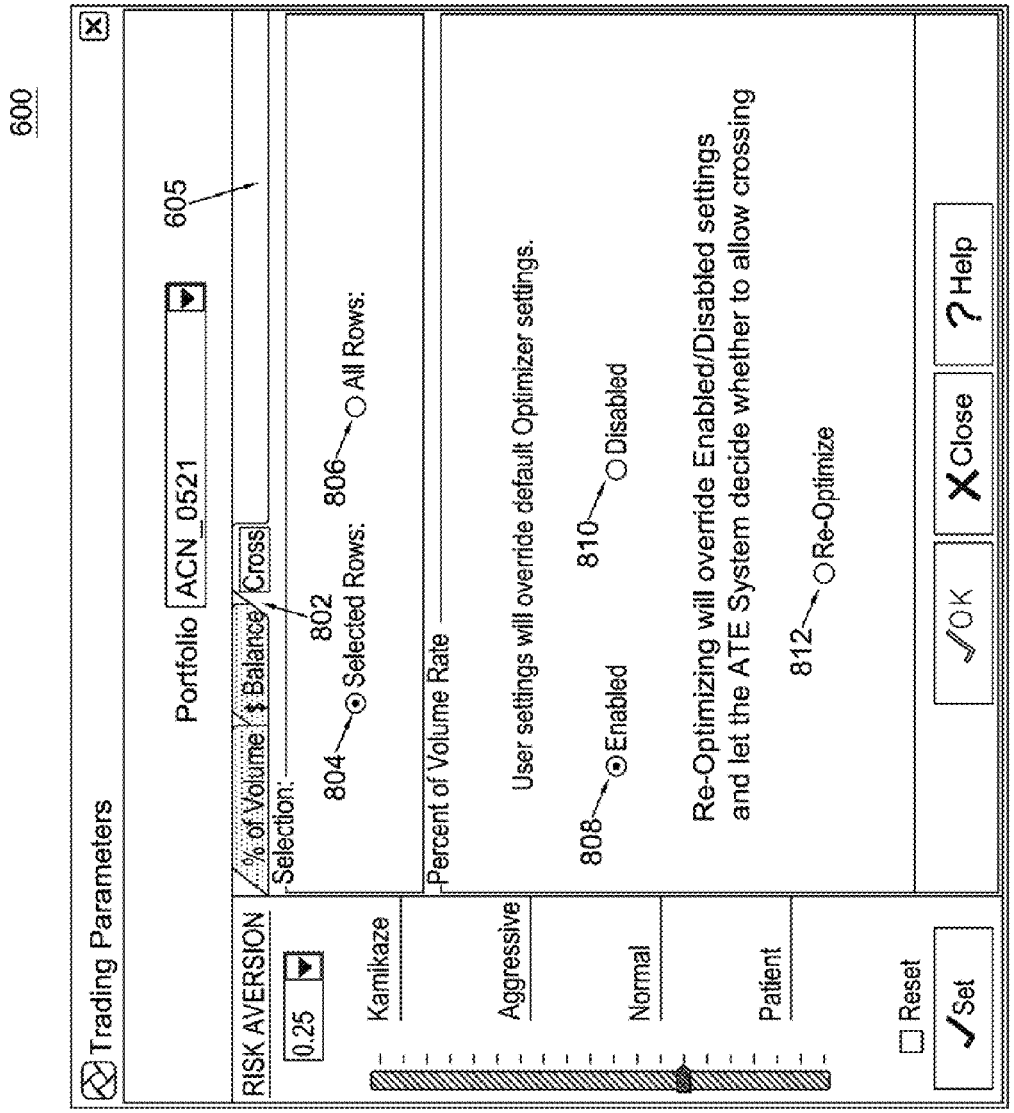

Tabs 605 can also include a cross settings tab 802 as shown in FIG. 8 in accordance with some embodiments. Tab 802 can include radio buttons 804 and 806 for selecting whether the cross eligibility setting selections in tab 802 are to be applied to only the selected positions in the portfolio or all positions in the portfolio, respectively. Tab 802 can also include radio buttons 808 and 810 for selecting whether user selected cross eligibility settings for the portfolio will override the default optimizer settings. Tab 802 can also include a radio button 812 for selecting to re-optimize the portfolio cross eligibility settings and use those settings to determine whether a position is eligible for trading instead of any override settings previously entered.

Figure 9:
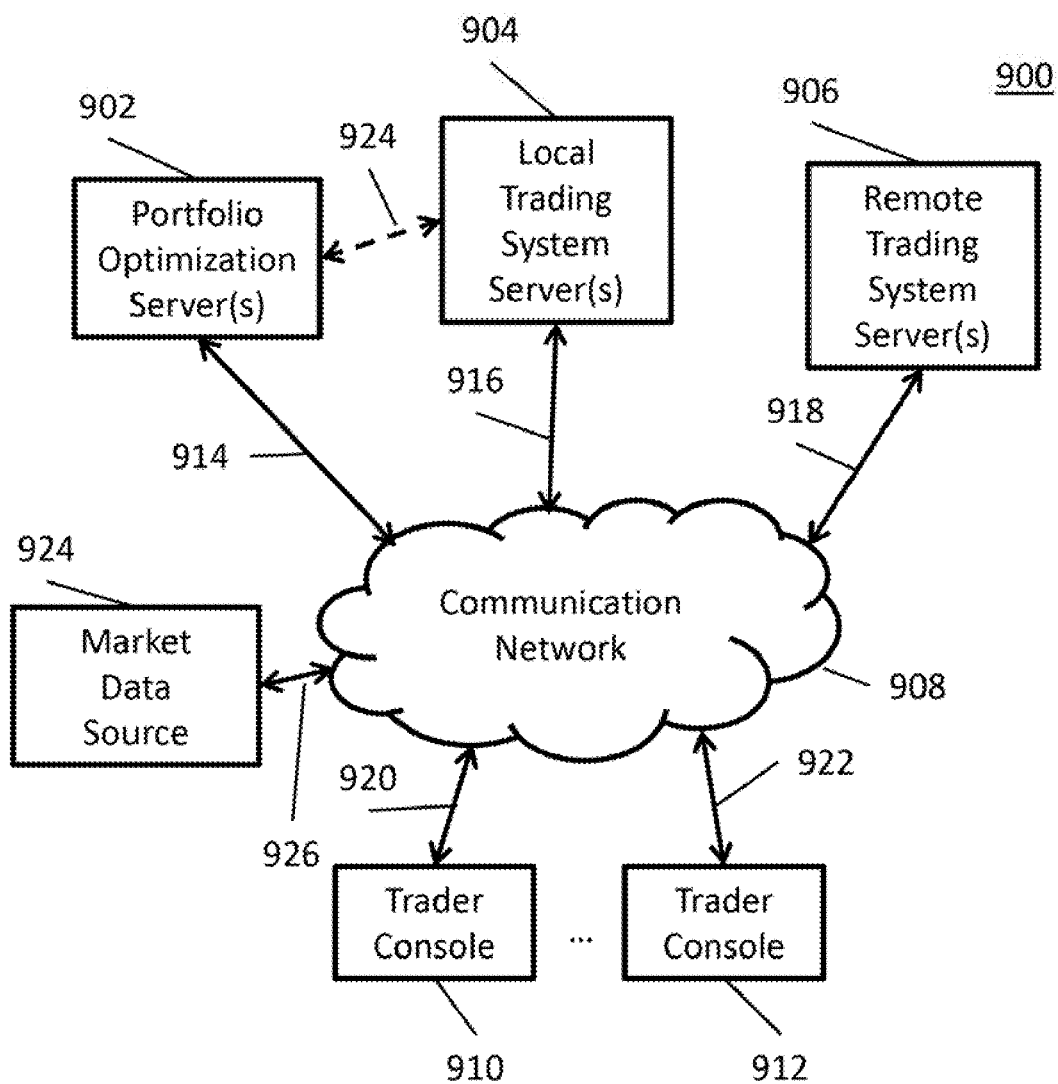
FIG. 9 is a diagram of hardware for performing process and presenting user interfaces as described herein in accordance with some embodiments.

FIG. 9 illustrates an example of hardware 900 that can be used in accordance with some embodiments. As illustrated, hardware 900 can include one or more portfolio optimization server(s) 902, one or more local trading system server(s) 904, one or more remote trading system server(s) 906, a communication network 908, one or more trader console(s) 910 and 912, and one or more market data source(s) 924.

Portfolio optimization server(s) 902 may be implemented using any suitable hardware and/or software. For example, server(s) 902 may be implemented (as further described below) in one or more computers, servers, digital processing devices, etc. (any of which may include a processor), using any suitable software for performing any suitable combination, set, and/or subset of the functions described herein. For example, server(s) 902 may perform the functions described in FIGS. 1 (with the exception of 120), 2-3, and 10-15.

Local trading system server(s) 904 and remote trading system server(s) 906 may be any suitable devices for placing and/or executing trades, such as executing trades based on POV trading rates, and/or crossing orders. For example, servers 904 and 906 may include one or more dark pools, electronic liquidity providers (ELPs), one or more open markets, etc. Dark pools may be any suitable mechanisms for managing and executing orders of undisclosed liquidity. ELPs may be any suitable electronic liquidity providers, and any suitable number of ELPs may be used. For example, ELPs may include internal dark pools, external dark pools, external alternative trading systems, an exchange, a market maker, a non-market-maker broker-dealer, an order management system scraping engine, etc. Open markets may be any suitable one or more markets for executing orders in securities. For example, open markets may include an exchange, such as the NY Stock Exchange, the American Stock Exchange, etc., an ECN, such as BATS, Direct Edge, etc., and/or an alternative trading system.

Communication network 908 may be any suitable communication network, and may include the Internet, wired networks, wireless networks, and/or any suitable communication mechanism. Communication via communication network 908 may be performed using any suitable communication technique or protocol. For example, in some embodiments, communication may be performed using the Financial Information exchange (FIX) protocol.

Trader consoles 910 and 912 may be any suitable mechanisms for viewing portfolio information (e.g., as described in connection with FIGS. 4 and 5), configuring trading parameters (e.g., as described in connect with FIGS. 6-8), submitting orders, receiving execution information, and/or inputting or presenting any suitable trade related information or data. In some embodiments, the trader consoles may be interactive with a human or fully automated. For example, traders interact with trader consoles by using an order management system, an execution management system, a manual order (e.g., a verbal order) submitted through an agent trading desk having a trader console, etc. Although two trader consoles are illustrated, any suitable number of trader consoles may be used.

Servers 902, 904, and 906, and trader consoles 910 and 912 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, trader consoles 910 and 912 can be implemented as a personal computer, a personal data assistant (PDA), a portable email device, a multimedia terminal, a mobile telephone, etc.

Market data source(s) 924 may be any suitable source of Level 1 and/or 2 market data.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

FIGS. 10-15 show examples of pseudo code processes 1000, 1100, 1200, 1300, 1400, and 1500 that can be used to automatically determine percentage of volume trading rates in accordance with some embodiments.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for automatically controlling trade executions based on percentage of volume (POV) trading rates, comprising:
at least one hardware processor that:
determines a market impact relationship for each of a plurality of positions included in a portfolio, wherein each of the market impact relationships models the impact on the price of a trade in the corresponding position;
determines a risk model associated with the portfolio, wherein the risk model is represented by:

$$\sigma_{cp}^2 = \sum_{j,i=1...N} \tau_{ij}\sigma_{j,i}\sqrt{t_i t_j}\, P_j S_j P_i S_i$$

wherein: $T_{ij}$ is an estimate of:

$$\frac{1}{3}\frac{\min(t_i, t_j)^3}{t_i t_j} - \frac{1}{2}\left(\frac{1}{t_j} + \frac{1}{t_i}\right)\min(t_i, t_j)^2 + \min(t_i, t_j);$$

$\sigma_{j,i}$ is the daily variance covariance in positions j and i;
$t_i$ is the trading horizon in days for position i;
$t_j$ is the trading horizon in days for position j;
$P_i$ is the price for a share in position i;
$P_j$ is the price for a share in position j;
$S_i$ is the number of shares in position i; and
$S_j$ is the number of shares in position j;
solves for a percentage of volume trading rate for each of the plurality of positions included in the portfolio based on the market impact relationship and the risk model; and
causes trades to be executed in at least one of the plurality of positions included in the portfolio at the percentage of volume trading rate corresponding to the at least one of the plurality of positions.

2. The system of claim 1, wherein the processor also determines cross eligibility for at least one of the plurality of positions.

3. The system of claim 2, wherein the processor determines cross eligibility based at least in part on a marginal contribution to risk calculation.

4. The system of claim 2, wherein the processor determines cross eligibility based at least in part on position size.

5. The system of claim 1, wherein the solving for the percentage of volume trading rate is also based on the Trader's Dilemma.

6. The system of claim 1, wherein the solving for the percentage of volume trading rate is performed by an optimizer.

7. The system of claim 1, wherein the solving for the percentage of volume trading rate is performed using non-linear constrained optimization.

8. A method for automatically controlling trade executions based on percentage of volume (POV) trading rates, comprising:
  determining, using at least one hardware processor, a market impact relationship for each of a plurality of positions included in a portfolio, wherein each of the market impact relationships models the impact on the price of a trade in the corresponding position;
  determining, using at least one hardware processor, a risk model associated with the portfolio, wherein the risk model is represented by:

$$\sigma_{cp}^2 = \sum_{j,i=1...N} \tau_{ij} \sigma_{j,i} \sqrt{t_i t_j}\, P_j S_j P_i S_i$$

wherein: $T_{ij}$ is an estimate of:

$$\frac{1}{3}\frac{\min(t_i, t_j)^3}{t_i t_j} - \frac{1}{2}\left(\frac{1}{t_j} + \frac{1}{t_i}\right)\min(t_i, t_j)^2 + \min(t_i, t_j);$$

$\sigma_{j,i}$ is the daily variance covariance in positions j and i;
  $t_i$ is the trading horizon in days for position i;
  $t_j$ is the trading horizon in days for position j;
  $P_i$ is the price for a share in position i;
  $P_j$ is the price for a share in position j;
  $S_i$ is the number of shares in position i; and
  $S_j$ is the number of shares in position j;
  solving, using at least one hardware processor, for a percentage of volume trading rate for each of the plurality of positions included in the portfolio based on the market impact relationship and the risk model; and
  causing, using at least one hardware processor, trades to be executed in at least one of the plurality of positions included in the portfolio at the percentage of volume trading rate corresponding to the at least one of the plurality of positions.

9. The method of claim 8, further comprising determining cross eligibility for at least one of the plurality of positions.

10. The method of claim 9, wherein determining cross eligibility is based at least in part on a marginal contribution to risk calculation.

11. The method of claim 9, wherein determining cross eligibility is based at least in part on position size.

12. The method of claim 8, wherein the solving for the percentage of volume trading rate is also based on the Trader's Dilemma.

13. The method of claim 8, wherein the solving for the percentage of volume trading rate is performed by an optimizer.

14. The method of claim 8, wherein the solving for the percentage of volume trading rate is performed using nonlinear constrained optimization.

15. A non-transitory computer-readable medium containing computer-executable instructions that, when executed by a hardware processor, cause the processor to perform a method for automatically controlling trade executions based on percentage of volume (POV) trading rates, the method comprising:
  determining a market impact relationship for each of a plurality of positions included in a portfolio, wherein each of the market impact relationships models the impact on the price of a trade in the corresponding position;
  determining a risk model associated with the portfolio, wherein the risk model is represented by:

$$\sigma_{cp}^2 = \sum_{j,i=1...N} \tau_{ij} \sigma_{j,i} \sqrt{t_i t_j}\, P_j S_j P_i S_i$$

wherein: $T_{ij}$ is an estimate of:

$$\frac{1}{3}\frac{\min(t_i, t_j)^3}{t_i t_j} - \frac{1}{2}\left(\frac{1}{t_j} + \frac{1}{t_i}\right)\min(t_i, t_j)^2 + \min(t_i, t_j);$$

$\sigma_{j,i}$ is the daily variance covariance in positions j and i;
  $t_i$ is the trading horizon in days for position i;
  $t_j$ is the trading horizon in days for position j;
  $P_i$ is the price for a share in position i;
  $P_j$ is the price for a share in position j
  $S_i$ is the number of shares in position i; and
  $S_j$ is the number of shares in position j;
  solving for a percentage of volume trading rate for each of the plurality of positions included in the portfolio based on the market impact relationship and the risk model; and
  causing trades to be executed in at least one of the plurality of positions included in the portfolio at the percentage of volume trading rate corresponding to the at least one of the plurality of positions.

16. The medium of claim 15, wherein the method further comprises determining cross eligibility for at least one of the plurality of positions.

17. The medium of claim 16, wherein determining cross eligibility is based at least in part on a marginal contribution to risk calculation.

18. The medium of claim 16, wherein determining cross eligibility is based at least in part on position size.

19. The medium of claim 15, wherein the solving for the percentage of volume trading rate is also based on the Trader's Dilemma.

20. The medium of claim 15, wherein the solving for the percentage of volume trading rate is performed by an optimizer.

21. The medium of claim 15, wherein the solving for the percentage of volume trading rate is performed using nonlinear constrained optimization.

* * * * *

UNITED STATES PATENT AND TRADEMARK OFFICE
CERTIFICATE OF CORRECTION

| | | |
|---|---|---|
| PATENT NO. | : 7,979,344 B2 | Page 1 of 1 |
| APPLICATION NO. | : 12/472364 | |
| DATED | : July 12, 2011 | |
| INVENTOR(S) | : James T. Kociuba | |

It is certified that error appears in the above-identified patent and that said Letters Patent is hereby corrected as shown below:

Claim 15, line 30, "Pj is the price for a share in position j" should be --Pj is the price for a share in position j;--.

Signed and Sealed this
Twenty-eighth Day of February, 2012

David J. Kappos
*Director of the United States Patent and Trademark Office*

UNITED STATES PATENT AND TRADEMARK OFFICE
CERTIFICATE OF CORRECTION

PATENT NO. : 7,979,344 B2
APPLICATION NO. : 12/472364
DATED : July 12, 2011
INVENTOR(S) : James T. Kociuba It is certified that error appears in the above-identified patent and that said Letters Patent is hereby corrected as shown below:

Claim 15, Column 14, line 30, "Pj is the price for a share in position j" should be --Pj is the price for a share in position j;--.

This certificate supersedes the Certificate of Correction issued February 28, 2012.

Signed and Sealed this
Twenty-seventh Day of March, 2012

David J. Kappos
*Director of the United States Patent and Trademark Office*